United States Patent
Cheng (10) Patent No.: US 12,200,412 B2
(45) Date of Patent: Jan. 14, 2025

(54) STORAGE SYSTEM

(71) Applicant: HUAWEI TECHNOLOGIES CO., LTD., Shenzhen (CN)

(72) Inventor: Wei Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 236 days.

(21) Appl. No.: 18/076,676

(22) Filed: Dec. 7, 2022

(65) Prior Publication Data

US 2023/0108111 A1    Apr. 6, 2023

Related U.S. Application Data

(63) Continuation of application No. PCT/CN2021/099900, filed on Jun. 12, 2021.

(30) Foreign Application Priority Data

Jun. 19, 2020   (CN) .......................... 202010562929.9

(51) Int. Cl.
  *H04Q 1/02*     (2006.01)
  *G06F 3/06*     (2006.01)
  *G06F 13/40*    (2006.01)

(52) U.S. Cl.
  CPC ............. *H04Q 1/15* (2013.01); *G06F 3/0619* (2013.01); *G06F 3/065* (2013.01); *G06F 3/0683* (2013.01); *G06F 13/409* (2013.01)

(58) Field of Classification Search
  None
  See application file for complete search history.

(56) References Cited

U.S. PATENT DOCUMENTS 5,928,367 A     7/1999   Nelson et al.
7,275,100 B2 *  9/2007   Yamagami .......... G06F 11/2094
                                              709/224

(Continued)

FOREIGN PATENT DOCUMENTS

CN     103246585 A    8/2013
CN     106844076 A    6/2017

(Continued)

OTHER PUBLICATIONS

Machine Translation of Japanese Patent Application JP 2004303121 A, 2004. (Year: 2004).*

(Continued)

*Primary Examiner* — Steven G Snyder (57) ABSTRACT

A storage system includes N horizontal backplanes and a first mirror backplane. Each horizontal backplane includes a first controller and a second controller on a same plane. The N first controllers and the N second controllers of the storage system form a first column and a second column in a vertical direction. The first mirror backplane is perpendicular to the horizontal backplanes, a first side of the first mirror backplane is connected to the horizontal backplanes, and a second side is connected to the controllers. A second side of the first controller has N second mirror ports and N second heartbeat ports, and a first side of the second controller has N first mirror ports and N first heartbeat ports. Wiring on the first mirror backplane includes wiring that interconnects the first mirror port of the second controller to the second mirror port of the first controller.

7 Claims, 3 Drawing Sheets

(56) References Cited

U.S. PATENT DOCUMENTS

| | | | | |
|---|---|---|---|---|
| 7,320,083 | B2* | 1/2008 | Davies | G06F 11/2035 |
| | | | | 714/4.11 |
| 7,330,999 | B2* | 2/2008 | Davies | G06F 11/2092 |
| | | | | 714/13 |
| 7,359,214 | B2* | 4/2008 | Heard | H05K 1/14 |
| | | | | 370/395.31 |
| 7,380,163 | B2* | 5/2008 | Davies | G06F 11/2028 |
| | | | | 714/43 |
| 7,401,254 | B2* | 7/2008 | Davies | G06F 11/2028 |
| | | | | 714/11 |
| 7,826,222 | B2* | 11/2010 | Aybay | H05K 7/20563 |
| | | | | 361/695 |
| 10,084,255 | B2* | 9/2018 | Wang | H05K 5/0065 |
| 10,595,431 | B1 | 3/2020 | McDaniel et al. | |
| 10,983,872 | B2* | 4/2021 | Shen | G06F 11/2094 |
| 12,066,961 | B2* | 8/2024 | Lin | G06F 3/0658 |
| 2002/0095489 | A1* | 7/2002 | Yamagami | G06F 11/2094 |
| | | | | 709/224 |
| 2012/0327597 | A1* | 12/2012 | Liu | H05K 7/20736 |
| | | | | 361/692 |
| 2021/0064478 | A1* | 3/2021 | Shen | G06F 11/2097 |

FOREIGN PATENT DOCUMENTS

| | | | | |
|---|---|---|---|---|
| CN | 209375701 U | | 9/2019 | |
| EP | 1271323 A2 | * | 1/2003 | G06F 11/2007 |
| EP | 2770682 A1 | * | 8/2014 | H01R 12/00 |
| WO | 2017198174 A1 | | 11/2017 | |
| WO | WO-2019206704 A1 | * | 10/2019 | |

OTHER PUBLICATIONS

Machine Translation of Chinese Patent Application CN 117440648 A, 2024. (Year: 2024).*

Machine Translation of Chinese Patent Application CN 108879150 B, 2020. (Year: 2020).*

Machine Translation of Chinese Patent Application CN 107766181 A, 2018. (Year: 2018).*

* cited by examiner

FIG. 4

STORAGE SYSTEM

CROSS-REFERENCE TO RELATED APPLICATIONS

This application is a continuation of International Application PCT/CN2021/099900, filed on Jun. 21, 2021, which claims priority to Chinese Patent Application No. 202010562929.9, filed on Jun. 19, 2020. The disclosures of the aforementioned applications are hereby incorporated by reference in their entirety.

TECHNICAL FIELD

Embodiments of this application relate to the field of storage technologies, and in particular, to a storage system.

BACKGROUND

As capacity and performance of storage systems gradually increase, a conventional vertical backplane pattern is being replaced with an orthogonal horizontal backplane architecture. However, to implement cluster communication between a plurality of nodes in a distributed scenario, each controller in a cluster is required to have corresponding mirror and heartbeat interconnection channels to another controller. As a result, channel latency and bandwidth requirements are extremely high, which raises a new requirement for design of a mirror channel and a heartbeat channel in the orthogonal architecture.

SUMMARY

This application provides a storage system, to implement full interconnection of mirror channels and heartbeat channels between a plurality of controllers in a horizontal backplane architecture.

According to a first aspect, a storage system is provided, including N horizontal backplanes and a first mirror backplane. Each horizontal backplane includes a first controller and a second controller on a same plane. The N horizontal backplanes are disposed in parallel. First controllers on the N horizontal backplanes form a first column in a vertical direction. Second controllers on the N horizontal backplanes form a second column in the vertical direction. The first mirror backplane is perpendicular to the horizontal backplanes, a first side of the first mirror backplane is connected to the N horizontal backplanes, and a second side of the first mirror backplane is connected to the controllers. A second side of the first controller has N second mirror ports and N second heartbeat ports, a first side of the second controller has N first mirror ports and N first heartbeat ports, a first mirror port of the second controller is interconnected to a second mirror port of the first controller, and a first heartbeat port of the second controller is interconnected to a second heartbeat port of the first controller. Wiring on the first mirror backplane includes wiring by which the first mirror port of the second controller is interconnected to the second mirror port of the first controller, and wiring by which the first heartbeat port of the second controller is interconnected to the second heartbeat port of the first controller.

In the foregoing technical solution, the mirror backplane provides wiring of high-bandwidth mirror channels and heartbeat channels between the controllers, so that full interconnection of the mirror channels and the heartbeat channels between the controllers is implemented in a horizontal backplane architecture. In addition, in this manner, only the mirror backplane needs to use a high-grade board, and the mirror backplane has a relatively small area and a relatively low layer quantity; thereby reducing costs of the storage system.

In a possible implementation, a horizontal width of the first mirror backplane is greater than a spacing between the first column and the second column. N second mirror ports of each first controller in the first column are respectively interconnected to one first mirror port of each second controller in the second column. N second heartbeat ports of each first controller in the first column are respectively interconnected to one first heartbeat port of each second controller in the second column.

In another possible implementation, a first side of the first controller has N first mirror ports and N first heartbeat ports, and a second side of the second controller has N second mirror ports and N second heartbeat ports. First mirror ports of all the first controllers in the first column are interconnected, and first heartbeat ports of all the first controllers in the first column are interconnected. Second mirror ports of all the second controllers in the second column are interconnected, and second heartbeat ports of all the second controllers in the second column are interconnected. The storage system further includes a second mirror backplane and a third mirror backplane. The second mirror backplane is located on a first side of the first column of controllers, and wiring on the second mirror backplane includes wiring by which the first mirror ports of the first controllers in the first column are interconnected and wiring by which the first heartbeat ports are interconnected. The third mirror backplane is located on a second side of the second column of controllers, and wiring on the third mirror backplane includes wiring by which the second mirror ports of the second controllers in the second column are interconnected and wiring by which the second heartbeat ports are interconnected.

In another possible implementation, each first mirror port of each first controller in the first column is interconnected to a first mirror port of another first controller in the first column. Each first heartbeat port of each first controller in the first column is interconnected to a first heartbeat port of another first controller in the first column.

In another possible implementation, each second mirror port of each second controller in the second column is interconnected to a second mirror port of another second controller in the second column. Each second heartbeat port of each second controller in the second column is interconnected to a second heartbeat port of another second controller in the second column.

In the foregoing technical solution, relative to each column of controllers, each mirror backplane is located on two sides of each column of controllers, and is located on a low-heat air duct of the controllers, which has relatively small obstruction to the air duct, thereby facilitating heat dissipation of the storage system.

In another possible implementation, the second mirror backplane is symmetrical to the third mirror backplane.

In another possible implementation, distributions of the mirror ports and the heartbeat ports of the first controller and the second controller are the same.

Each controller has a same port layout and a mirror backplane architecture is symmetrical, so that design of wiring on the mirror backplane can be simplified.

DESCRIPTION OF EMBODIMENTS

The following clearly describes the technical solutions in embodiments of this application with reference to the accompanying drawings in embodiments of this application. It is clear that the described embodiments are some but not all of embodiments of this application.

Mirroring refers to uninterrupted and real-time data copying. A cache mirroring technology is a solution designed to resolve a data loss in a cache that may occur when a storage processing fault occurs, in which two copies of cached data are obtained and respectively stored in a main memory and a mirrored memory, and during system working, data is written to both of the two memories. This allows for two complete memory backups.

In an existing vertical backplane architecture of a storage system, to meet a high-bandwidth requirement of mirroring, the entire vertical backplane needs to use a high-grade board. For example, to implement high-bandwidth mirror interconnection of remote direct memory access (RDMA) between a plurality of controllers, four single serializers/deserializers with a bandwidth of 25 Gbps may be used to form a quad SFP (QSFP) interface with a bandwidth of 100 Gbps. In the vertical backplane architecture, a high-grade board higher than M6N needs to be used as a material of an entire printed circuit board (PCB) or a signal relay chip needs to be added, which increases costs of the entire system. In addition, the vertical backplane is a bottleneck of a system air duct, which greatly affects a heat dissipation capability of the system.

A storage system and a method for connecting controllers of the storage system in embodiments of this application may implement interconnection of mirror channels and heartbeat channels between a plurality of controllers in a horizontal backplane architecture, thereby reducing costs of the storage system.

Figure 1:
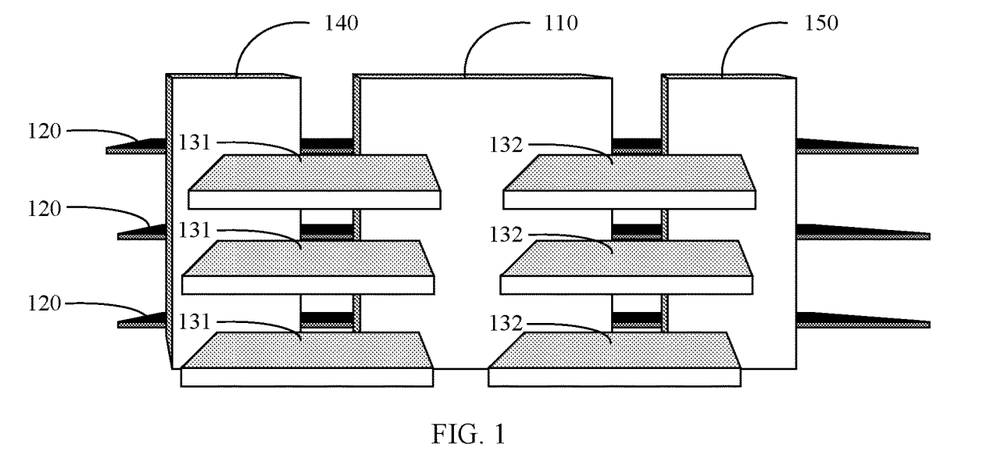
FIG. 1 is a schematic diagram of a structure of a storage system according to an embodiment of this application.

The storage system in the embodiments of this application includes a plurality of controllers, N horizontal backplanes, and a first mirror backplane. Wiring on the mirror backplane includes wiring for interconnection of mirror channels and heartbeat channels between the controllers. FIG. 1 is a schematic diagram of a storage system according to an embodiment of this application. As shown in FIG. 1, the storage system in this embodiment of this application includes a first mirror backplane 110 and N horizontal backplanes 120. The N horizontal backplanes are disposed in parallel, and a same plane of each horizontal backplane includes a first controller 131 and a second controller 132. N first controllers 131 on the N horizontal backplanes 120 form a first column, and N second controllers 132 on the N horizontal backplanes form a second column. The first mirror backplane 110 is perpendicular to the horizontal backplanes 120, a first side of the first mirror backplane 110 is connected to the horizontal backplanes 120, and a second side of the first mirror backplane 110 is connected to the first controller 131 and the second controller 132. In some other embodiments, the storage system may further include a second mirror backplane 140 and a third mirror backplane 150. For example, as shown in FIG. 1, the storage system includes three mirror backplanes and three horizontal backplanes. The three mirror backplanes are perpendicular to the horizontal backplanes, and first sides of the three mirror backplanes are respectively connected to the horizontal backplanes. The storage system further includes six controllers, each layer includes two controllers, and the controllers are connected to second sides of the mirror backplanes. As shown in the figure, the first column includes three controllers, and the second column also includes three controllers.

The mirror backplanes provide wiring for interconnection of mirror ports and heartbeat ports between different layers of controllers, so that full interconnection of the mirror ports and the heartbeat ports between the controllers of the storage system is implemented in a horizontal backplane architecture.

Figure 2:
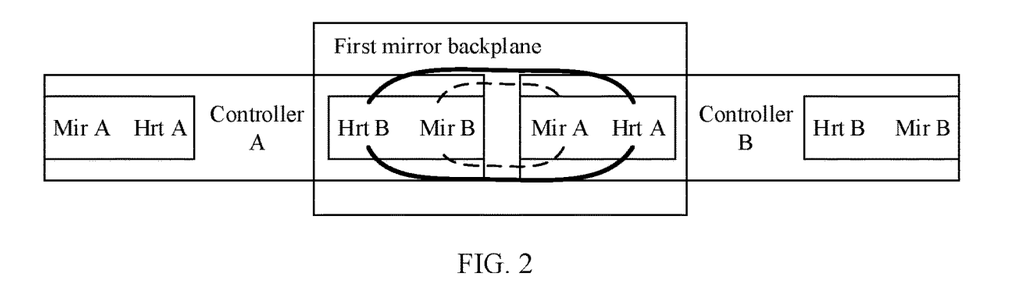
FIG. 2 is a schematic diagram of interconnection of mirror channels and heartbeat ports between controllers according to an embodiment of this application.
Figure 3:
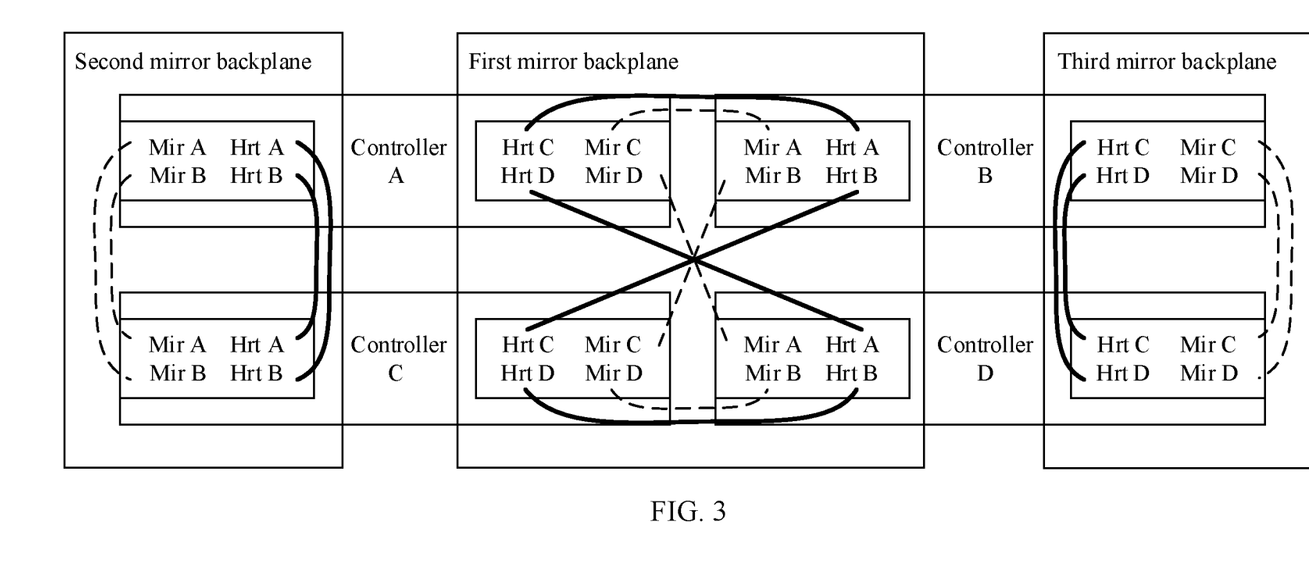
FIG. 3 is a schematic diagram of interconnection of mirror channels and heartbeat ports between controllers according to another embodiment of this application.
Figure 4:
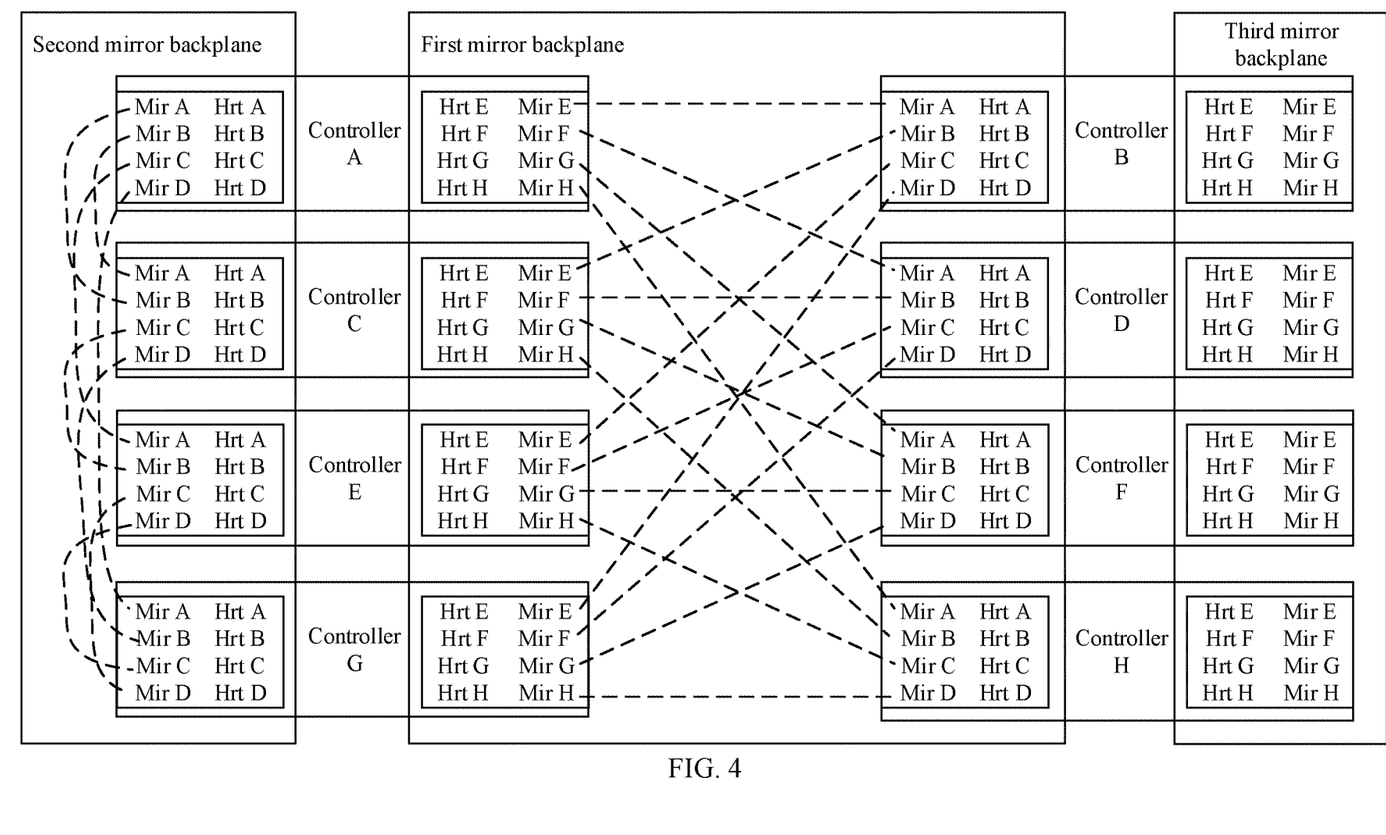
FIG. 4 is a schematic diagram of interconnection of mirror channels and heartbeat ports between controllers according to another embodiment of this application.

With reference to FIG. 2 to FIG. 4, the following describes a storage system and a structure in which mirror ports and heartbeat ports of controllers of the storage system are interconnected on a mirror backplane in embodiments of this application.

For example, in some embodiments, the storage system includes two controllers, one horizontal backplane, and one first mirror backplane. A full interconnection structure of mirror channels and heartbeat channels between the two controllers is shown in FIG. 2. To show wiring on the first mirror backplane more clearly, FIG. 2 shows a schematic diagram including only the controllers and the first mirror backplane, and the horizontal backplane is omitted. The first mirror backplane in FIG. 2 is equivalent to the first mirror backplane 110 shown in FIG. 1.

In this case, N=1. As shown in FIG. 2, the storage system includes two controllers: a controller A and a controller B. The controller A and the controller B are located at a same layer, the controller A (first controller) is located in a first column, and the controller B (second controller) is located in a second column. In this embodiment of this application, the controller located in the first column may be referred to as a "first controller", and the controller located in the second column may be referred to as a "second controller".

A first side of each controller has one first mirror port and one first heartbeat port, and a second side has one second mirror port and one second heartbeat port. For example, the first side of each controller has a mirror port (mirror, Mir) A and a heartbeat port (heartbeat, Hrt) A, and the second side of each controller has Mir B and Hrt B. In addition, the mirror ports and the heartbeat ports on the two sides of each controller are symmetrical. For example, the controller A is used as an example. In the two ports on the first side of the controller A, Mir A is on an outer side, and Hrt A is on an inner side: in the two ports on the second side of the controller A, Mir B is on an outer side, and Hrt B is on an inner side. A distribution of the mirror ports and the heartbeat ports on the controller B is the same as that on the controller A. The inner side represents a side close to a center of the controller, and the outer side represents a side far from the center of the controller.

As shown in FIG. 2, the controller A and the controller B are physically separated. To implement interconnection between the controllers A and B, a horizontal width of the first mirror backplane is greater than a spacing between the first column and the second column, and wiring on the first mirror backplane includes wiring for interconnecting the second mirror port of the controller (controller A) in the first column and the first mirror port of the controller (controller B) in the second column, and the second heartbeat port of the controller in the first column and the first heartbeat port of the controller in the second column.

On the first mirror backplane, for each controller in the first column, N second mirror ports of the controller are respectively interconnected to first mirror ports of different controllers in the second column. A connection manner for heartbeat ports is similar to that of the mirror ports.

It should be understood that, when the storage system has two controllers, in a connection manner shown in FIG. 2, the first controller (controller A) in FIG. 2 may include only the mirror port and the heartbeat port on the second side, and the second controller (controller B) may include only the first mirror port and the first heartbeat port.

As shown in FIG. 2, Mir B on the second side of the controller A is connected to Mir A on the first side of the controller B. Hrt B on the second side of the controller A is connected to Hrt A on the first side of the controller B. A thick solid line in the figure indicates an interconnection channel between the heartbeat port A and the heartbeat port B, and a dashed line indicates an interconnection channel between the mirror port A and the mirror port B.

It should be understood that in this embodiment of this application, in addition to the high-bandwidth mirror channel and heartbeat channel, the mirror backplane may further include another channel required for communication between controllers or a channel required for communication between a controller and another component in the storage system. This is not limited in this embodiment of this application.

When the storage system includes two controllers, other than a layout manner shown in FIG. 2, the controller A and the controller B may alternatively be respectively located on two planes. In this case, interconnection of the mirror ports and the heartbeat ports may also be implemented for the controller A and the controller B by using the mirror backplane.

For example, in some embodiments, the storage system includes four controllers. A full interconnection structure of mirror channels and heartbeat channels between the four controllers is shown in FIG. 3. To show wiring on mirror backplanes more clearly, FIG. 3 shows a schematic diagram including only the controllers and the mirror backplanes, and horizontal backplanes are omitted.

In this case, N=2. As shown in FIG. 3, the storage system includes four controllers: a controller A, a controller B, a controller C, and a controller D. The controllers A and B are located at a same layer, and the controllers C and D are located at a same layer. The controllers A and C are located in a first column, and the controller B and controller D are located in a second column. A first side of each controller has two first mirror ports and two first heartbeat ports. For example, the first side of each controller includes Mir A, Hrt A, Mir B, and Hrt B. A second side of each controller has two second mirror ports and two second heartbeat ports. For example, the second side of each controller includes Mir C, Hrt C, Mir D, and Hrt D. In addition, the mirror ports and the heartbeat ports on the two sides of each controller are symmetrical. For example, the controller A is used as an example. In the ports on the first side of the controller A, the mirror ports (Mir A and Mir B) are on an outer side, and the heartbeat ports (Hrt A and Hrt B) are on an inner side; in the ports on the second side of the controller A, the mirror ports (Mir C and Mir D) are on an outer side, and the heartbeat ports (Hrt C and Hrt D) are on an inner side. A distribution of ports on another controller is the same as that on the controller A. The inner side represents a side close to a center of the controller, and the outer side represents a side far from the center of the controller.

In addition to a distribution manner shown in FIG. 3, the ports on each controller may have another distribution manner. For example, in some other embodiments, ports on the first side of the controller A may be Mir A, Hrt A, Mir C, and Hrt C. For another example, in some other embodiments, ports on the first side of the controller A may be Mir A, Hrt A, Mir D, and Hrt D.

As shown in FIG. 3, the four controllers are physically separated. To implement interconnection between the four controllers, the storage system includes three mirror backplanes: a second mirror backplane, a third mirror backplane, and a first mirror backplane. The first mirror backplane is equivalent to the first mirror backplane 110 shown in FIG. 1, the second mirror backplane is equivalent to the second mirror backplane 140 shown in FIG. 1, and the third mirror backplane is equivalent to the third mirror backplane 150 shown in FIG. 1.

The second mirror backplane is located on a first side of the first column of controllers (controllers A and C), to cover Mir A, Hrt A, Mir B, and Hrt B on the first sides of the controllers A and C. The third mirror backplane is located on a second side of the second column of controllers (controllers B and D), to cover Mir C, Hrt C, Mir D, and Hrt D on the second sides of the controllers A and C. The first mirror backplane is located between the second mirror backplane and the third mirror backplane, to cover ports on a second side of the first column of controllers and ports on a first side of the second column of controllers. In some embodiments, the second mirror backplane is symmetrical to the third mirror backplane.

On the second mirror backplane, for each controller in the first column, two first mirror ports of the controller are respectively connected to first mirror ports of the other controller in the first column. An interconnection manner for heartbeat ports is similar to that of the mirror ports. FIG. 3 shows a possible controller interconnection manner. As shown in FIG. 3, on the first mirror backplane, Mir A on the controller A is connected to Mir B on the controller C, Mir B on the controller A is connected to Mir A on the controller C, Hrt A on the controller A is connected to Hrt B on the controller C, and Hrt B on the controller A is connected to Hrt A on the controller C.

A wiring manner on the third mirror backplane is similar to that on the second mirror backplane. FIG. 3 shows a possible controller interconnection manner. As shown in FIG. 3, Hrt C on the controller B is connected to Hrt D on the controller D, Hrt D on the controller B is connected to Hrt B on the controller D, Mir C on the controller B is connected to Mir D on the controller D, and Mir D on the controller B is connected to Mir C on the controller D.

On the first mirror backplane, for each controller in the first column, N second mirror ports of the controller are respectively interconnected to first mirror ports of different controllers in the second column. A connection manner for heartbeat ports is similar to that of the mirror ports.

FIG. 3 shows a possible controller interconnection manner. As shown in FIG. 3, Hrt C on the controller A is connected to Hrt A on the controller B, Mir C on the controller A is connected to Mir A on the controller B. Hrt D on the controller C is connected to Hrt B on the controller D, Mir D on the controller C is connected to Mir B on the controller D. Hrt D on the controller A is connected to Hrt A on the controller D. Mir D on the controller A is connected to Mir A on the controller D. Hrt B on the controller B is connected to Hrt C on the controller C, and Mir B on the controller B is connected to Mir C on the controller C.

As shown in FIG. 3, in connection lines between two ports, a thick solid line indicates a heartbeat channel connecting heartbeat ports, and a dashed line indicates a mirror channel connecting mirror ports.

For example, in some embodiments, the storage system includes eight controllers. A full interconnection structure of mirror channels and heartbeat channels between the eight controllers is shown in FIG. 4. To show wiring on mirror backplanes more clearly, FIG. 4 shows a schematic diagram including only the controllers and the mirror backplanes, and horizontal backplanes are omitted.

In this case, N=4. As shown in FIG. 4, the storage system includes eight controllers: a controller A, a controller B, a controller C, a controller D, a controller E, a controller F, a controller G, and a controller H. The eight controllers are distributed in two columns. For example, the controllers A and B are located at a same layer, the controllers C and D are located at a same layer, the controllers E and F are located at a same layer, and the controllers G and H are located at a same layer. The controller A, the controller C, the controller E, and the controller G are in a first column, and the other four controllers are in a second column.

A first side of each controller includes four first mirror ports: Mir A, Mir B, Mir C, and Mir D, and four first heartbeat ports: Hrt A, Hrt B, Hrt C, and Hrt D. A second side of each controller includes four second mirror ports: Mir E, Mir F, Mir G, and Mir H, and four second heartbeat ports: Hrt E, Hrt F, Hrt G, and Hrt H. In addition, the mirror ports and the heartbeat ports on the two sides of each controller are symmetrical. For example, the controller A is used as an example. In the ports on the first side of the controller A, the mirror ports (Mir A to Mir D) are on an outer side, and the heartbeat ports (Hrt A to Hrt D) are on an inner side: in the ports on the second side of the controller A, the mirror ports (Mir E to Mir H) are on an outer side, and the heartbeat ports (Hrt E to Hrt H) are on an inner side. A distribution of ports on another controller is the same as that on the controller A. The inner side represents a side close to a center of the controller, and the outer side represents a side far from the center of the controller.

In addition to a distribution manner shown in FIG. 4, the ports on each controller may have another distribution manner. For example, in some other embodiments, ports on the first side of the controller A may be Mir A, Mir C, Mir E, and Mir G and corresponding heartbeat ports. For another example, in some other embodiments, ports on the first side of the controller A may be Mir E, Mir F, Mir G, and Mir H and corresponding heartbeat ports.

As shown in FIG. 4, the eight controllers are physically separated. To implement interconnection between the eight controllers, at least one mirror backplane of the storage system includes a second mirror backplane, a third mirror backplane, and a first mirror backplane. The first mirror backplane is equivalent to the first mirror backplane 110 shown in FIG. 1, the second mirror backplane is equivalent to the second mirror backplane 140 shown in FIG. 1, and the third mirror backplane is equivalent to the third mirror backplane 150 shown in FIG. 1.

The second mirror backplane is located on a first side of the first column of the controllers (controller A, controller C, controller E, and controller G). The third mirror backplane is symmetrical to the second mirror backplane, and is located on a second side of the second column of controllers (controller B, controller D, controller F, and controller H). The first mirror backplane is located between the second mirror backplane and the third mirror backplane, and may cover ports on a second side of the first column of controllers and ports on a first side of the second column of controllers and wiring for interconnecting the ports.

It should be understood that, because a layout of the controllers and a layout of the ports on the controllers are symmetrical, FIG. 4 shows only parts of wiring on the second mirror backplane and the first mirror backplane, and wiring on the third mirror backplane is symmetrical to wiring on the second mirror backplane.

It should be further understood that, because a distribution of mirror ports and heartbeat ports on each controller is symmetrical, wiring for interconnecting heartbeat ports is symmetrical to wiring for interconnecting mirror ports. To show full interconnection wiring of mirror channels or heartbeat channels between controllers in this embodiment of this application more clearly, FIG. 4 shows only interconnection wiring of some mirror ports, and an interconnection manner for heartbeat ports is similar to an interconnection manner for mirror ports.

On the second mirror backplane, for each controller in the first column, each mirror port on the first side of the controller is connected to one mirror port on a first side of another controller in the first column, and the two mirror ports are different mirror ports. On the second mirror backplane, for each controller in the first column, four first mirror ports of the controller are respectively connected to first mirror ports of other controllers in the first column. An interconnection manner for heartbeat ports is similar to that of the mirror ports.

For example, in some embodiments, as shown in FIG. 4, the controller A is used as an example. Mirror ports Mir B, Mir C, and Mir D on the first side of the controller A are respectively connected to Mir A on first sides of other controllers (controller C, controller E, and controller G) in the first column: Mir B of the controller A is connected to Mir A of the controller C. Mir C of the controller A is connected to Mir A of the controller E. Mir D of the controller A is connected to Mir A of the controller G. Mir A on the first side of the controller A is connected to Mir B on the first side of the controller C.

For another example, in some other embodiments, Mir B of the controller A may be connected to Mir A of the controller E. Mir C of the controller A may be connected to Mir A of the controller G. Mir D of the controller A may be connected to Mir A of the controller C. In some other embodiments, Mir B of the controller A may be connected to Mir A of the controller G. Mir C of the controller A may be connected to Mir A of the controller C. Mir D of the controller A may be connected to Mir A of the controller E.

In addition to the foregoing connection manner, there is another connection manner between the mirror ports of the controllers on the second mirror backplane. This is not limited in this embodiment of this application.

First mirror ports of another controller located in the first column and second mirror ports of a controller located in the second column may be connected in a manner similar to the connection manner of the mirror ports of the controller A. Details are not described herein again.

Similar to the interconnection method for mirror ports, heartbeat ports (first heartbeat ports) on the first side of the first column of controllers may also be interconnected by wiring on the second mirror backplane, and heartbeat ports (second heartbeat ports) on the second side of the second column of controllers may also be interconnected by wiring on the third mirror backplane.

On the first mirror backplane, for each controller in the first column, N second mirror ports of the controller are respectively interconnected to first mirror ports of different controllers in the second column. A connection manner for heartbeat ports is similar to that of the mirror ports.

For example, as shown in FIG. 4, in some embodiments, each mirror port (Mir E to Mir H) on the second side of each controller in the first column is connected to Mir A on a first side of a controller in the second column: Mir E of the controller A is connected to Mir A of the controller B. Mir F of the controller A is connected to Mir A of the controller D. Mir G of the controller A is connected to Mir A of the controller F. Mir H of the controller A is connected to Mir A of the controller H.

Another controller may use a manner similar to that of the controller A. For example, Mir E of the controller C is connected to Mir B of the controller B. Mir F of the controller C is connected to Mir B of the controller D. Mir G of the controller C is connected to Mir B of the controller F. Mir H of the controller C is connected to Mir B of the controller H. A connection method for mirror channels of the controller E and the controller G is similar to the foregoing connection method, and details are not described herein again.

It should be understood that only the interconnection method for mirror channels is shown on the first mirror backplane shown in FIG. 4, and an interconnection method for heartbeat channels is similar to the interconnection method for mirror channels, and details are not described herein again.

In some other embodiments, because a layout of the controllers, a layout of ports on the controllers, and a layout of the mirror backplanes are completely symmetrical, to simplify design of wiring, wiring of mirror channels and heartbeat channels may be designed symmetrically.

For example, as shown in FIG. 4, on the second mirror backplane, Mir A of the controller A is connected to Mir B of the controller C, and correspondingly, Hrt A of the controller A may be connected to Hrt B of the controller C. Symmetrical to the second mirror backplane, on the third mirror backplane, Mir E of the controller B may be connected to Mir F of the controller D, and correspondingly, Hrt E of the controller B is connected to Hrt F of the controller D. On the first mirror backplane, Mir E of the controller A is connected to Mir A of the controller B, and correspondingly, Hrt E of the controller A may be connected to Hrt A of the controller B.

It should be understood that in this embodiment of this application, in addition to the high-bandwidth mirror channel and heartbeat channel, the mirror backplane may further include another channel required for communication between controllers or communication between a controller and another component in the storage system. This is not limited in this embodiment of this application.

In the foregoing technical solution, the mirror backplane provides wiring of high-bandwidth mirror channels and heartbeat channels between controllers, so that only the mirror backplane needs to use a high-grade board, which has a small area and a relatively low layer quantity, thereby reducing costs. In addition, the mirror backplane has a relatively small area, and the mirror backplane is located on two sides of each controller, and is located on a low-heat air duct of the controllers, which has relatively small obstruction to the air duct, thereby facilitating heat dissipation of the storage system.

In the storage system in this embodiment of this application, because the horizontal backplane architecture is used, compared with a conventional vertical backplane architecture, a heat dissipation capacity of the entire system may be increased by 300 W to 500 W. In addition, because only the mirror backplane that provides wiring for high-speed interconnection channels between controllers needs to use a high-grade board, costs of the entire system are greatly reduced. Using four controllers as an example, costs of two ordinary horizontal backplanes plus three mirror backplane with high-grade boards are significantly lower than that of a vertical backplane entirely made of a high-grade board.

It should be understood that "some embodiments" or "an embodiment" mentioned in the entire specification means that particular features, structures, or characteristics related to the embodiment are included in at least one embodiment of this application. Therefore, "in some embodiments" or "in an embodiment" appearing throughout the specification does not refer to a same embodiment. In addition, these particular features, structures, or characteristics may be combined in one or more embodiments in any appropriate manner.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A storage system comprising:
   N horizontal backplanes, wherein each horizontal backplane comprises a first controller and a second controller on a same plane, and the N horizontal backplanes are disposed in parallel; and
   a first mirror backplane, wherein
   first controllers on the N horizontal backplanes form a first column in a vertical direction;
   second controllers on the N horizontal backplanes forming a second column in a vertical direction;
   the first mirror backplane is perpendicular to the horizontal backplanes, a first side of the first mirror backplane is connected to the N horizontal backplanes, and a second side of the first mirror backplane is connected to the first controller and the second controller;
   a second side of the first controller has N second mirror ports and N second heartbeat ports, a first side of the second controller has N first mirror ports and N first heartbeat ports, a first mirror port of the second controller is interconnected to a second mirror port of the first controller, and a first heartbeat port of the second controller is interconnected to a second heartbeat port of the first controller; and
   wiring on the first mirror backplane comprises wiring interconnecting the first mirror port of the second controller to the second mirror port of the first controller, and wiring interconnecting the first heartbeat port of the second controller to the second heartbeat port of the first controller,
   wherein N is a positive integer.

2. The storage system according to claim 1, wherein
   a horizontal width of the first mirror backplane is greater than a spacing between the first column and the second column;
   N second mirror ports of each first controller in the first column are respectively interconnected to one first mirror port of each second controller in the second column; and N second heartbeat ports of each first controller in the first column are respectively interconnected to one first heartbeat port of each second controller in the second column.

3. The storage system according to claim 2, wherein
a first side of the first controller has N first mirror ports and N first heartbeat ports, and a second side of the second controller has N second mirror ports and N second heartbeat ports:
first mirror ports of all the first controllers in the first column are interconnected, and first heartbeat ports of all the first controllers in the first column are interconnected:
second mirror ports of all the second controllers in the second column are interconnected, and second heartbeat ports of all the second controllers in the second column are interconnected:
the storage system further comprises a second mirror backplane and a third mirror backplane, wherein
the second mirror backplane is located on a first side of the first column of the first controllers, and wiring on the second mirror backplane comprises wiring by which the first mirror ports of the first controllers in the first column are interconnected and wiring by which the first heartbeat ports are interconnected; and
the third mirror backplane is located on a second side of the second column of the second controllers, and wiring on the third mirror backplane comprises wiring interconnecting the second mirror ports of the second controllers in the second column and wiring interconnecting the second heartbeat ports.

4. The storage system according to claim 3, wherein each first mirror port of each first controller in the first column is interconnected to a first mirror port of another first controller in the first column; and
each first heartbeat port of each first controller in the first column is interconnected to a first heartbeat port of another first controller in the first column.

5. The storage system according to claim 3, wherein each second mirror port of each second controller in the second column is interconnected to a second mirror port of another second controller in the second column; and
each second heartbeat port of each second controller in the second column is interconnected to a second heartbeat port of another second controller in the second column.

6. The storage system according to claim 3, wherein the second mirror backplane is symmetrical to the third mirror backplane.

7. The storage system according to claim 1, wherein distributions of the mirror ports and the heartbeat ports of the first controller and the second controller are identical.

* * * * *